United States Patent [19]
Parsons

[11] Patent Number: 5,806,926
[45] Date of Patent: Sep. 15, 1998

[54] CONVERTIBLE VEHICLE CHILD SAFETY SEAT

[76] Inventor: David A. Parsons, 3904 S. View Ct., Jefferson, Md. 21755

[21] Appl. No.: 897,025

[22] Filed: Jul. 18, 1997

[51] Int. Cl.⁶ .................................................. A47C 15/00
[52] U.S. Cl. .............................. 297/238; 297/14; 297/234
[58] Field of Search .............................. 297/238, 14, 112, 297/113, 250.1, 232, 234, 237, 332, 333

[56] References Cited

U.S. PATENT DOCUMENTS

| | | | |
|---|---|---|---|
| 3,594,037 | 7/1971 | Sherman | 297/14 |
| 3,762,764 | 10/1973 | McJunkin | 297/14 |
| 4,533,176 | 8/1985 | Wyttenbach | 297/238 |
| 5,380,060 | 1/1995 | Sponsler et al. | 297/238 |
| 5,588,700 | 12/1996 | Homier | 297/238 |
| 5,609,392 | 3/1997 | Stigson | 297/234 X |

FOREIGN PATENT DOCUMENTS 2241186  3/1995  France ................................... 297/332

Primary Examiner—Laurie K. Cranmer
Attorney, Agent, or Firm—Michael W. York

[57] ABSTRACT

A convertible vehicle child safety seat that permits the seat to be safely used by a child as well as by an adult without any modification of the seat. The convertible vehicle child safety seat is easily operated by any adult passenger of a vehicle without any special training or instructions. The convertible vehicle child safety seat automatically converts to a seat for an adult when it is not in use by a child. The convertible vehicle child safety seat is particularly suited for use in public transportation vehicles such as buses, railway passenger cars and the like, particularly since such vehicles have no provisions for protecting young children.

6 Claims, 2 Drawing Sheets

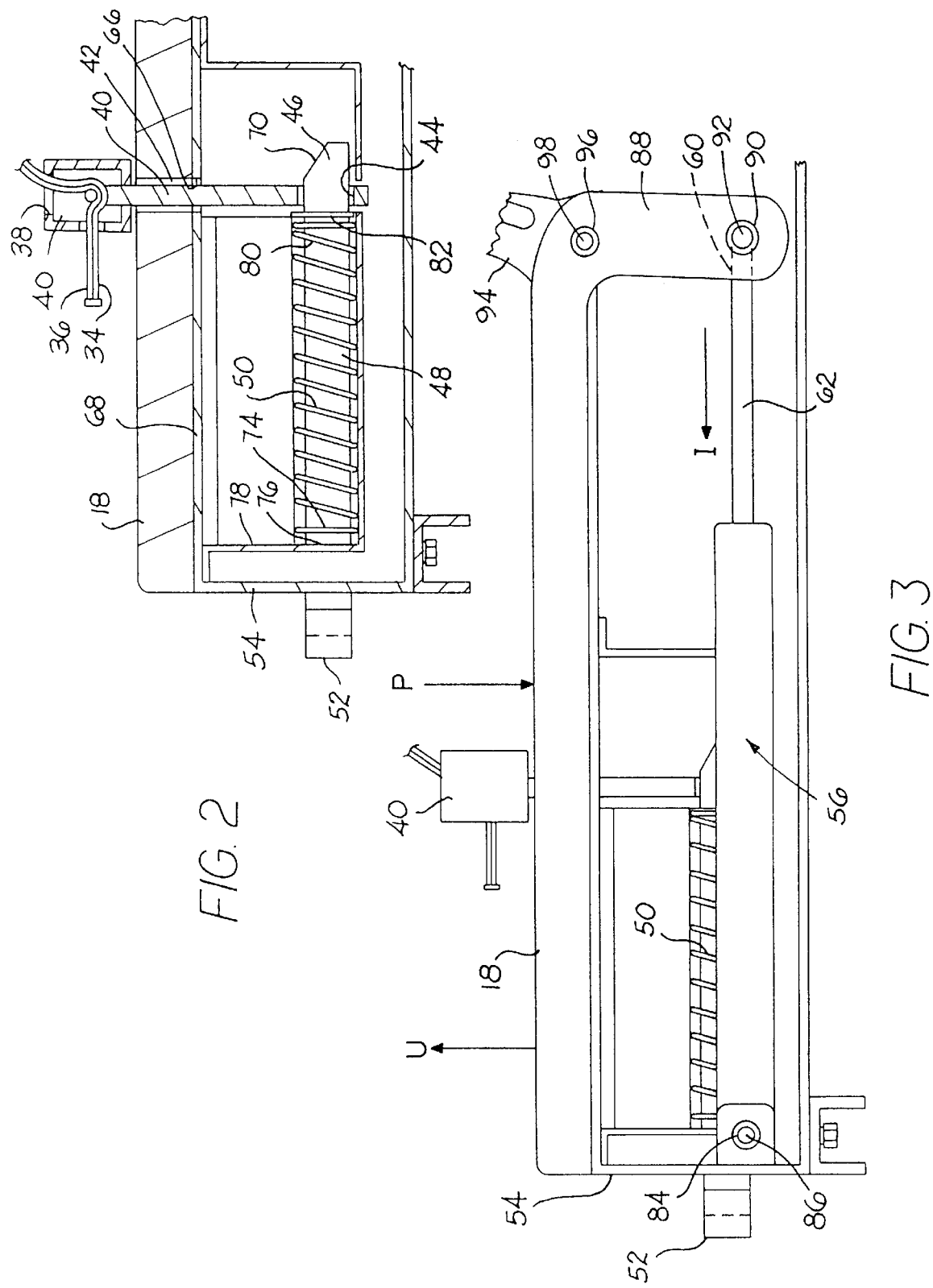

CONVERTIBLE VEHICLE CHILD SAFETY SEAT

BACKGROUND OF THE INVENTION

Currently many passenger type vehicles with seats for passengers lack safety belts to restrain or hold the passenger in the vehicle seat. An exception to this is seats in aircraft. Consequently, the occupant of the vehicle seat can be thrown about in the vehicle if the vehicle is subject to sudden movements of the vehicle that could be caused by emergency stops or movements of the vehicle to avoid an accident. This is usually not that detrimental when the occupants of the vehicle seats are adults who are capable of grabbing on to the seat or other surrounding structure to avoid being thrown off of the seat. However, in the case of children, they lack the capability and strength to prevent themselves from being thrown off of their seats.

Consequently, a definite problem exists that needs to be addressed to prevent possible injury or even death to children that occupy passenger seats in many current vehicles. The types of vehicles that are involved include but are not limited to public transportation buses of all types, town buses, school buses, railway passenger cars, and passenger ships. One reason child seat belts and safety seats do not exist on such vehicles is the need to readily have the seats available for use by both adults and children and safety seats and the like would interfere with the ready use of the seat by an adult passenger. Consequently, a definite need exists for a child safety seat that readily permits the seat to be used by an adult.

The child safety seat ideally should not require the assistance of the bus driver or similar vehicle operator or another member of the crew or staff of the vehicle to operate since that detracts from the driver's or other person's primary duties and also increases the cost associated with the use of the child's safety seat. Therefore, a child safety seat that can be readily operated by a vehicle passenger as opposed to the vehicle driver or staff is highly desirable.

The present convertible vehicle child safety seat is specially suited for public mass transit vehicles such as buses, subway cars, and trains that currently do not have provisions for restraining a child with safety straps or the like. This provides added stability for the child or youngster when the vehicle is turning, stopping, and accelerating. With this invention, instead of a child getting thrown about and possibly knocked off the seat and injured, the child is securely restrained on the seat. This seat invention also provides added protection in case of an accident and this seat invention is easily transformed for use by an adult.

The convertible vehicle child safety seat invention is hidden away when it is not in use and the seat looks very similar to any other seat in a vehicle and the seat is comfortably used by an adult when it is not occupied by a child. The invention can be manufactured as a replacement to the existing seats or could be used to retrofit current vehicle seats.

SUMMARY OF THE INVENTION

This invention relates to vehicle seats and more particularly to seats for safely seating a child occupant of the seat that can safely be used by children or can be used by adults.

It is an object of the invention to provide a convertible vehicle child safety seat that is capable of being used by both a child and an adult.

It is an object of the invention to provide a convertible vehicle child safety seat that automatically converts to a seat for adult use when it is not occupied by a child.

It is an object of the invention to provide a convertible vehicle child safety seat that automatically converts to a seat for adult use when it is not occupied by a child through retraction of the child seat portion.

It is an object of the invention to provide a convertible vehicle child safety seat that automatically converts to a seat for adult use when it is not occupied by a child through retraction of the child seat portion into the back portion of the main seat.

It is an object of the invention to provide a convertible vehicle child safety seat that automatically converts to a seat for adult use when it is not occupied by a child through retraction of the child seat portion into the back portion of the main seat that is accomplished by a piston assembly.

It is an object of the invention to provide a convertible vehicle child safety seat that automatically converts to a seat for adult use when it is not occupied by a child through retraction of the child seat portion into the back portion of the main seat that is accomplished by a piston assembly with a piston that decompresses or retracts when the child is removed from the seat.

These and other objects of the invention will be apparent from the invention that includes a convertible vehicle child safety seat that permits the seat to be safely used by a child as well as by an adult without any modification of the seat. The convertible vehicle child safety seat is easily operated by any adult passenger of a vehicle without any special training or instructions. The convertible vehicle child safety seat automatically converts to a seat for an adult when it is not in use by a child. The convertible vehicle child safety seat is particularly suited for use in public transportation vehicles such as buses, railway passenger cars and the like, particularly since such vehicles have no seating provisions for protecting young children.

BRIEF DESCRIPTION OF THE DRAWINGS

The invention will be hereinafter Lore fully described with respect to the accompanying drawings in which:

FIG. 2 is a sectional view of a portion of the structure illustrated in FIG. 1 taken substantially in the direction 2—2 thereof; and FIG. 3 is a sectional view of a portion of the structure illustrated in FIG. 1 taken substantially in the direction 3—3 thereof.

DETAILED DESCRIPTION OF THE INVENTION

Figure 1:
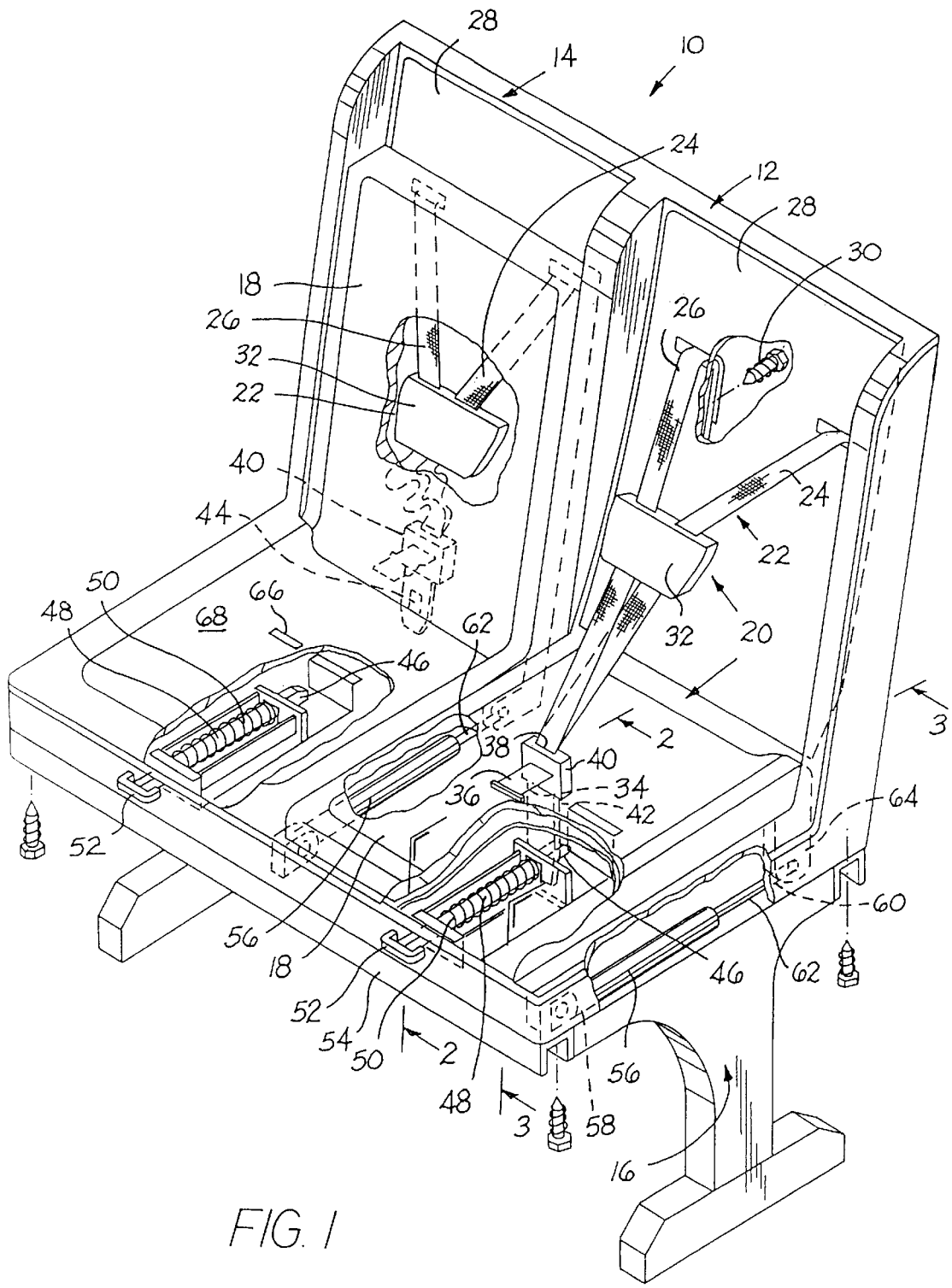
FIG. 1 is a perspective of the convertible vehicle child safety seat invention with certain portions thereof broken away to illustrate important parts of the invention.

Referring first to FIG. 1, the convertible vehicle child safety seat invention is illustrated and is designated generally by the number 10. As illustrated, the convertible vehicle child safety seat 10 has two identical seats located side by side that are designated generally by the numbers 12 and 14 that are contained in or supported by a conventional combined support unit 16. The seat 12 illustrates the seat in its deployed position for a child and the seat 14 illustrates the seat in its undeployed position for use as an adult seat. The seat 12 or 14 has a pivoting back portion 18 that, as illustrated for the seat 12, can be manually pulled forward and downward and as illustrated in the seat 14 can form part of the normal seat back which makes the seat hardly distinguishable from a conventional vehicle seat.

As illustrated in FIG. 1, the child safety seat portion is designated generally by the number 20 and comprises a generally Y-shaped safety harness 22 that has two belts 24 and 26 that are sized and shaped to fit over the shoulders of the child. The upper portions of these belts are secured to the seat back by bolts or the like as illustrated by the bolt 30. The belts 24 and 26 slide through a flexible foam or other soft material chest protecting member 32 that is sized and shaped to fit against the chest of the child that is occupying the seat 12.

As also illustrated in FIG. 1, the lower end portions 34 and 36 of the belts 24 and 26 slide through a slot 38 in a fastener 40. This fastener 40 fits into a slot 42 in the seat back portion 18 when the seat back portion is in its downward rotational position as illustrated for the seat 12. The fastener 40 also has a slot 44 located in its lower end portion that is sized and shaped to be engaged by the projecting end portion 46 of a spring loaded plunger 48 that is biased rearward by a compressed coil spring 50. The plunger 48 has a generally T-shaped handle 52 on its outer end that projects outward from the forward portion 54 of the seat and this permits the fastener 40 to be released when it is pulled manually outward to further compress the coil spring 50.

As further illustrated in FIG. 1, the seat 12 or 14 is provided with a contracting piston 56 that has its forward portion 58 secured to the forward portion 54 of the seat and the rear portion 60 of its piston rod 62 pivotally secured to the rear portion 64 of the pivoting back portion 18 of the seat in such a manner as to cause the seat back portion 18 to pivot into its upward position as illustrated for the seat 14 when the handle 52 is pulled outward and the child is removed from the seat back portion 18. As illustrated for the seat 14, with the seat back portion 18 in its upward position the child safety portion is stored behind the seat back portion 18 and this permits the seat 18 to be used in a normal fashion by an adult passenger.

FIG. 2 illustrates in greater detail certain features of the fastener 40 and the spring loaded plunger 48 and associated structure. As previously indicated, the fastener 40 slides into an aperture or slot 42 in the seat back, but it also slides into a suitably sized and shaped slot 66 in the bottom 68 of the seat 12 or 14. It will be noted that the end portion 46 has a sloping cam surface 70 so that downward manual pressure on the fastener 40 causes the end portion 72 of the fastener 40 to force the plunger outward or toward the forward portion 54 of the seat 12 or 14. The projection 46 will then be forced into the slot 44 of the fastener 40. This results due to the action or force of the coil spring 50 that has one end 74 pressing against the end 76 of a tubular housing 78 and the other end 80 pressing against a circular collar 82 that forms part of or is rigidly secured to the plunger 48.

FIG. 3 illustrates in greater detail the contracting piston 56. As illustrated, the forward portion 58 of the piston 56 is pivotally connected to the forward portion 54 of the seat 12 or 14 through the use of a bushing 84 and an associated bolt 86. Also, the rear or outer end portion 60 of its piston rod 62 is pivotally connected to a downward projection 88 of the back portion 18 by a bushing 90 and associated bolt 92. The seat back portion 18 is pivotally connected to the seat frame 94 through a. bushing 96 and an associated bolt 98. Consequently, when pressure indicated by the letter P is not applied to the seat back portion 18, the rod 62 contracts and pulls inward to apply a force in the direction indicated by the I on the portion 88 to cause the seat portion 18 to rotate upward as indicated by the letter U about the bushing 96. As a consequence, the seat back 18 assumes the position indicated in FIG. 1 for the seat 14.

The convertible vehicle child safety seat 10 is made and used in the following manner. All of the components of the invention 10 are well known in the art and are conventional in nature and made of conventional materials. This includes the plunger 48 as well as the piston 56. However, their assembly and locations as previously described is novel. In order to use the invention 10, the pivoting back portion 18 is manually pulled forward by an adult passenger and the child is then placed upon the upper portion of this pivoting back portion 18. The weight of the child (indicated by the letter P) holds the pivoting back portion 18 in its downward position as indicated in FIG. 1 for the seat 12. The adult then places the Y-shaped safety harness 22 that has the belts 24 and 26 over the chest of the child and inserts the fastener 40 into the slot 42. This secures the belts 24 and 26 in place along with the chest protector member 32 to safely secure the child in place. Adjustments to the belt 24 and 26 tension can be made by pulling on the lower belt portions 34 and 36 by pushing in on them.

At the appropriate time, when the child is to be released from the seat 12, an adult passenger merely pulls out on the T-shaped handle 52 to release the plunger 48 and hence the fastener 40 and the associated harness 22. This permits the child to be removed from the seat back portion 18 and in view of the previously described contracting piston 56, the seat assumes the position illustrated in FIG. 1 for the seat 14 to allow normal seating of an adult passenger.

Although the invention has been described in considerable detail with reference to a certain preferred embodiment it will be appreciated and understood that various changes and modifications may be made without departing from the spirit and scope of the invention as defined in the appended claims.

What is claimed is:

1. A adult vehicle seat in combination with a child safety seat for protecting a child while seated in a vehicle comprising an adult seat, a child safety seat, said child safety seat being part of said adult seat and having retracting means for automatically retracting said child safety seat into a portion of said adult seat to form part of a fully contoured adult seat when said child is not located in said child safety seat.

2. The adult vehicle seat in combination with a child safety seat for protecting a child while seated in a vehicle of claim 1 wherein said child safety seat also has extension means for permitting the child safety seat to be extended to be used by a child.

3. The adult vehicle seat in combination with a child safety seat for protecting a child while seated in a vehicle of claim 2 wherein said child safety seat has safety straps.

4. The adult vehicle seat in combination with a child safety seat for protecting a child while seated in a vehicle of claim 3 further comprising latch means associated with said safety straps for securing a child in said child safety seat.

5. The adult vehicle seat in combination with a child safety seat for protecting a child while seated in a vehicle of claim 4 wherein said latching means has associated releasing means.

6. The adult vehicle seat in combination with a child safety seat for protecting a child while seated in a vehicle of claim 5 wherein said adult seat has a forward portion and said releasing means is located on the forward portion of said adult seat.

* * * * *